(12) United States Patent
Hynecek et al.

(10) Patent No.: US 10,383,416 B2
(45) Date of Patent: Aug. 20, 2019

(54) FOLIO CASE WITH CARD HOLDER AND SHOCK-ABSORBING IMPACT GEOMETRY

(71) Applicant: Samsonite IP Holdings S.àr.l., Luxembourg (LU)

(72) Inventors: Bryan Lee Hynecek, Redwood City, CA (US); Darrick Del Moral, San Bruno, CA (US); Alan Ng, San Francisco, CA (US); Ivan Chen, Mountain View, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 0 days.

(21) Appl. No.: 15/863,098

(22) Filed: Jan. 5, 2018

(65) Prior Publication Data

US 2019/0208878 A1     Jul. 11, 2019

(51) Int. Cl.
*A45C 11/00* (2006.01)
*A45C 11/18* (2006.01)

(52) U.S. Cl.
CPC ............ *A45C 11/00* (2013.01); *A45C 11/182* (2013.01); *A45C 2011/002* (2013.01)

(58) Field of Classification Search
CPC ..... H04M 1/185; A45C 2011/002–003; A45C 11/00; A45C 11/182; A45C 13/02; A45C 13/002; A45C 2200/15; G06F 1/166; G06F 1/1626; G06F 1/1628; G06F 2200/1632–1634; H04B 1/3888; H05K 5/0221

(Continued)

(56) References Cited

U.S. PATENT DOCUMENTS 5,265,720 A * 11/1993 Meliconi ............. H01H 9/0242
                                                        150/165
8,490,783 B1 * 7/2013 Fan .................... H04M 1/185
                                                        206/45.23

(Continued)

FOREIGN PATENT DOCUMENTS

| KR | 200472205 Y1  | 4/2014 |
| KR | 101422194 B1  | 7/2014 |
| WO | 2013129763 A1 | 9/2013 |

OTHER PUBLICATIONS

International Search Report including Written Opinion for Application No. PCT/IB2019/000035 dated May 17, 2019, 13 pages.

*Primary Examiner* — Chun Hoi Cheung
*Assistant Examiner* — Brijesh V. Patel
(74) *Attorney, Agent, or Firm* — Lerner, David, Littenberg, Krumholz & Mentlik, LLP

(57) ABSTRACT

A case for a mobile device, including a main body having a mobile-device recess configured to hold the mobile device, and a cover attached to the main body and having a front portion configured to move between a closed state where the cover covers the mobile-device recess and an open state where the cover does not cover the mobile-device recess so that the mobile-device recess is exposed. The front portion of the cover includes an inside side facing the mobile-device recess of the main body when the front portion is in the closed state, a card cavity configured to accept at least one card, and a flap configured to move between a closed state where the flap covers at least one part of the card cavity and an open state where the flap does not cover the at least one part of the card cavity, exposing the card cavity.

20 Claims, 15 Drawing Sheets

(58) Field of Classification Search
USPC ........ 206/320, 45.2, 37, 579, 751, 755, 762,
206/764, 45.21, 305, 472–475,
206/45.23–45.26, 45.28; 220/4.22–4.23,
220/810, 812–813, 816, 836–837, 840,
220/350; 361/679.01, 679.14–679.15;
455/575.8, 575.1, 347, 575.3
See application file for complete search history.

(56) References Cited

U.S. PATENT DOCUMENTS

| | | | | |
|---|---|---|---|---|
| 8,596,449 | B2 * | 12/2013 | Mongan | A45C 11/182 206/320 |
| 8,655,422 | B2 * | 2/2014 | Stiehl | B29C 45/1676 361/730 |
| 8,708,140 | B2 * | 4/2014 | Liu | A45C 11/00 206/320 |
| 8,718,731 | B1 * | 5/2014 | Tang | H04M 1/185 206/305 |
| 8,755,852 | B2 * | 6/2014 | Hynecek | A45C 11/00 455/575.8 |
| 8,887,903 | B2 * | 11/2014 | Diebel | A45C 11/00 206/305 |
| 9,056,696 | B1 * | 6/2015 | Reyes | A45C 11/00 |
| 9,098,238 | B2 * | 8/2015 | Richardson | H04M 1/185 |
| D754,651 | S * | 4/2016 | Roberts | D14/250 |
| D756,344 | S * | 5/2016 | Roberts | D14/250 |
| D757,704 | S * | 5/2016 | Roberts | D14/250 |
| D776,645 | S * | 1/2017 | Del Moral | D14/250 |
| D805,064 | S * | 12/2017 | Lee | D14/250 |
| 9,866,255 | B1 * | 1/2018 | Ketter-Muldrow | H04B 1/3888 |
| 2003/0150756 | A1 * | 8/2003 | Kajiya | A45C 13/02 206/320 |
| 2012/0043234 | A1 * | 2/2012 | Westrup | A45C 3/02 206/320 |
| 2012/0067751 | A1 | 3/2012 | Mongan et al. | |
| 2013/0001105 | A1 | 1/2013 | Mongan et al. | |
| 2013/0105354 | A1 * | 5/2013 | Wyner | B65D 81/1275 206/586 |
| 2014/0274232 | A1 * | 9/2014 | Tages | H04M 1/185 455/575.8 |
| 2015/0119118 | A1 * | 4/2015 | Ashley | H04M 1/04 455/575.8 |
| 2015/0129095 | A1 * | 5/2015 | Marin | A45C 13/02 150/106 |
| 2015/0141095 | A1 * | 5/2015 | Kim | H04M 1/185 455/575.8 |
| 2015/0195929 | A1 | 7/2015 | Roberts et al. | |
| 2015/0295617 | A1 * | 10/2015 | Lai | H04B 1/3888 455/575.8 |
| 2016/0157573 | A1 * | 6/2016 | Del Moral | H04M 1/185 224/191 |
| 2016/0295981 | A1 * | 10/2016 | Lay | A45C 11/00 |

* cited by examiner

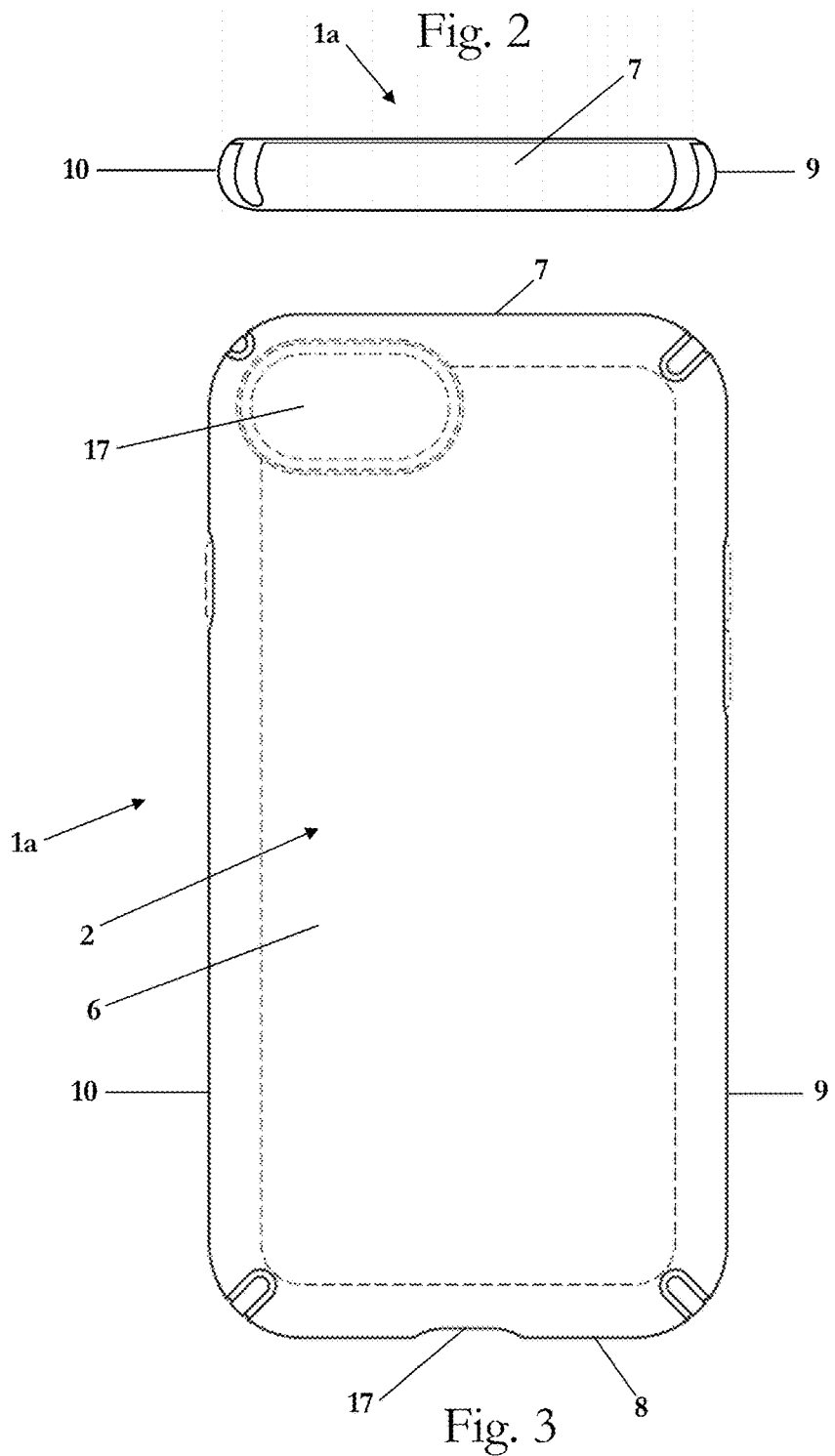

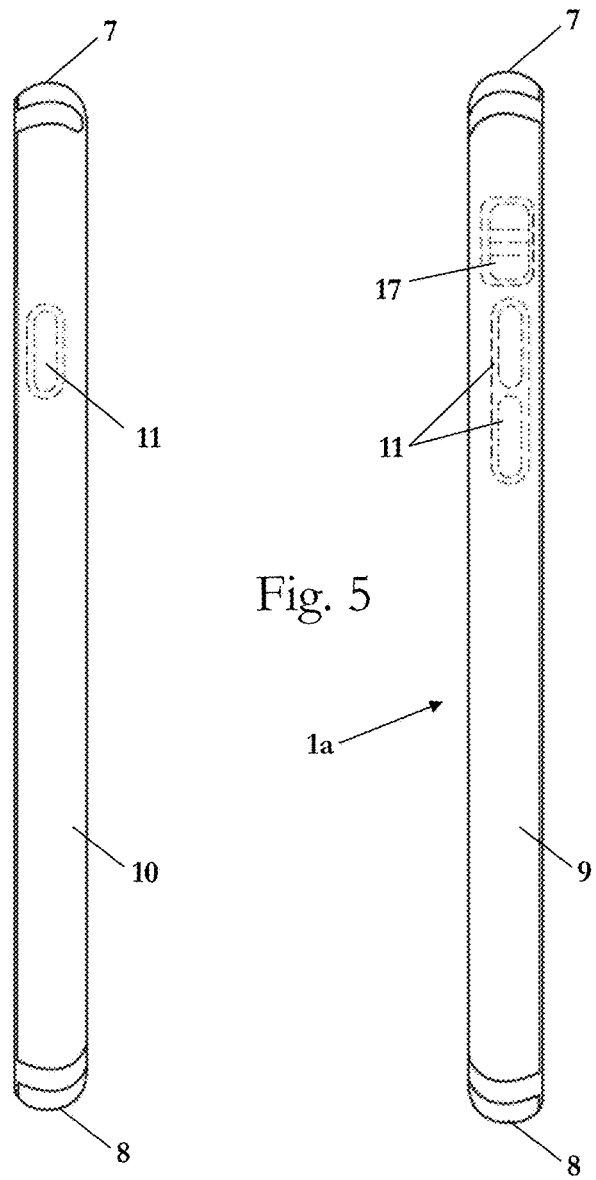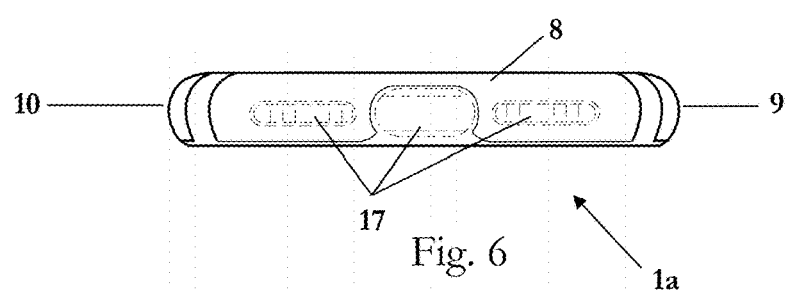

US 10,383,416 B2

FOLIO CASE WITH CARD HOLDER AND SHOCK-ABSORBING IMPACT GEOMETRY

FIELD OF THE INVENTION

The present invention relates to a folio case for a mobile device. The case includes shock-absorbing impact geometry in the form of triangular ridges that protrude from the inner surface of the sides of the case. The case also includes a pocket in the cover of the case to hold various types of card (e.g., credit cards, payment cards, coupons, receipts, identification cards, merchandise credit cards, gift cards, business cards, metro cards, etc.).

Cases for mobile devices have been designed to provide at least some protection from impact events, such as when the device is dropped, hit, or otherwise struck. In order to provide such protection, materials are often employed which noticeably increase the thickness and weight of the case, and thus impact the portability and ease of use of the resultant protected device. One way to improve the impact protection of a case is to increase the amount of material in the case that provides the impact protection. But this increases the cost of the case in terms of materials, and further increases the size and weight of the case, which is undesirable to users.

US 2015/0195929 discloses a case for a mobile device, the case includes a band arranged to surround the edge of the device. The band includes a layer of flexible polymer. A separate layer of a damping material that is softer than the flexible polymer is provided within the flexible polymer layer. The damping material has a plurality of protrusions projecting inwardly from the inner periphery of the band to engage with the device. But these protrusions are thin semicircular protrusions. While these protrusion do absorb some shock, they are imperfect in that, as the protrusions deform/compress between the mobile device and the rest of the case, the surface area of the protrusions that contact the case to absorb the impact increases very quickly.

US 2012/0067751, now U.S. Pat. No. 8,267,251, and US 2013/0001105, now U.S. Pat. No. 8,596,449, disclose cases for enclosing a personal electronic device which may also enclose one or more cards. The pocket for holding the cards is arranged in the back of the case, between the case back and a personal electronic device arranged in the case. But some users prefer folio cases, which have covers that flip over the front of the case to cover the front of a device arranged in the case. Such a cover protects the screen of the device and prevents accidental activation of touch-sensitive functions on the screen of the device.

SUMMARY OF THE INVENTION

As such, it is desirable to provide a new case for a protective device which can provide increased shock/impact protection to a mobile device, a folio cover, and a pocket for holding one or more cards without adding significantly to the cost, size, or weight of the case.

According to the present invention there is therefore provided a case for a mobile device as described by way of example below and in the accompanying claims.

In one embodiment of the invention there is provided a case (1) for a mobile device, including a main body (1a) having a mobile-device recess (19) configured to hold the mobile device, and a cover (1b) that is attached to the main body (1a) and has a front portion (30) that is configured to move between a closed state where the cover (1b) covers the mobile-device recess (19) and an open state where the cover (1b) does not cover the mobile-device recess (19) so that the mobile-device recess (19) is exposed. The front portion (30) of the cover (1b) includes an inside side (30a) that faces the mobile-device recess (19) of the main body (1a) when the front portion (30) is in the closed state, a card cavity (36) that is configured to accept at least one card (200), and a flap (34) that is configured to move between a closed state where the flap (34) covers at least one part of the card cavity (36) and an open state where the flap (34) does not cover the at least one part of the card cavity (36) so that the card cavity (36) is exposed.

In another embodiment, the flap (34) is formed on the inside side (30a) of the front portion (30) of the cover so that the card cavity (36) is only accessible from the inside side (30a) of the front portion (30).

In yet another embodiment, when the flap (34) is in the closed state, a mobile-device-facing surface of the flap (34) and a mobile-device-facing surface of the inside side (30a) form one continuous, flat mobile-device-facing surface that faces the mobile-device recess (19) when the front portion (30) of the cover (1b) is in the closed state.

In a further embodiment, the flap (34) includes a free end (34a), and a notch (37) to assist a user in moving the flap (34) from the closed state to the open state.

In yet a further embodiment, the case (1) further includes at least one friction portion (33) arranged on the inside side (30a) of the front portion (30) of the cover (1b), the at least one friction portion (33) having a coefficient of friction that is greater than a surface of the inside side (30a).

In another embodiment, the cover (1b) further includes a rear portion (31) that is connected to a rear side (6) of the main body (1a), and a first hinge portion (32) that is connected to both the front portion (30) and the rear portion (31) of the cover (1b). The front portion (30) rotates around the hinge portion (32) to move between the closed state and the open state.

In yet another embodiment, the rear portion (31) of the cover (1b) includes a connecting portion (31a) that is connected to the rear side (6) of the main body (1a), a rotating portion (31b), and a second hinge portion (31c) that is connected to both the connecting portion (31a) and the rotating portion (31b) to enable the rotating portion (31b) to rotate with respect to the rear side (6) so that the case 1 may be placed in a stand state.

In a further embodiment, in the stand state, a side (9) that is connected to and extends away from the rear side (6) of the main body (1a) rests on the inside side (30a) of the front portion (30) of the cover (1b).

In yet a further embodiment, the main body (1a) further comprises a rear recess (22) in which the rear portion (31) of the cover (1b) is arranged when the front portion (30) of the cover (1b) is in the closed state.

In another embodiment, the cover (1b) further includes a first hinge portion (32) that is connected to the front portion (30) of the cover (1b). The front portion (30) rotates around the hinge portion (32) to move between the closed state and the open state. At least part of the hinge portion is arranged within and surrounded by the main body (1a) to attach the cover (1b) to the main body (1a).

In yet another embodiment, the main body (1a) further includes a first layer (2) that includes a first material, and a second layer (3) that includes a second material different from the first material. The at least part of the hinge portion is arranged between the first layer (2) and the second layer (3).

In a further embodiment, the card cavity (36) is configured to accept at least one card (200) selected from the group consisting of credit card, a payment card, an identification card, a business card, a coupon, a receipt, a merchandise credit card, and a gift card.

In yet a further embodiment, the front portion (30) further includes a first piece that forms at least part of the inside side (30a), a second piece that forms at least part of the flap (34), and which is rotatably connected to the first piece, the second piece being distinct from the first piece, and a third piece that forms at least part of an outside side (30b) of the front portion (30), and which is fixedly connected to the first piece, the third piece being distinct from the first and second pieces. The card cavity (36) is formed between the first and third pieces. Each of the first, second, and third pieces includes a same or different material selected from the group consisting of hardened plastic materials, rigid or semi-rigid plastic materials, rigid/hard rubber materials, polycarbonate materials, metals, alloys, para aramid materials, wood, glass, mirror, quartz, and any combination thereof.

In another embodiment, the case (1) further including a first side (9) with an inside surface and an outside surface opposite to the inside surface, a second side (10) with an inside surface and an outside surface opposite to the inside surface, a third side (7) with an inside surface and an outside surface opposite to the inside surface, and a fourth side (8) with an inside surface and an outside surface opposite to the inside surface. The inside surface of the first side (9) faces toward the inside surface of the second side (10). The inside surface of the third side (7) faces toward the inside surface of the fourth side (8). The first and second sides (9,10) are arranged between the third and fourth sides (7,8), and the third and fourth sides (7,8) are arranged between the first and second sides (9,10), so that the first, second, third, and fourth sides (9,10,7,8) form at least part of a frame configured to surround a periphery of the mobile device when the mobile device is arranged inside the case (1). At least one of the inside surfaces of the first, second, third, and fourth sides (9,10,7,8) includes triangular protrusions (4) that have a triangular cross section and extend toward the inside of the case, so that an apex of each of the triangular protrusions (4) contacts the mobile device when it is arranged inside the case.

In yet another embodiment, at least two of the inside surfaces of the first, second, third, and fourth sides (9,10,7,8) include the triangular protrusions (4).

In a further embodiment, at least three of the inside surfaces of the first, second, third, and fourth sides (9,10,7,8) include the triangular protrusions (4).

In yet a further embodiment, the inside surface of the first side (9) is connected to the inside surface of the third side (7) to form a first corner, the first corner having an inside surface that includes at least one of the triangular protrusions (4).

In another embodiment, the inside surface of the second side (10) is connected to the inside surface of the third side (7) to form a second corner, the second corner having an inside surface that includes at least one of the triangular protrusions (4).

In yet another embodiment, the inside surface of the second side (10) is connected to the inside surface of the fourth side (8) to form a third corner, the third corner having an inside surface that includes at least one of the triangular protrusions.

In a further embodiment, the case (1) further includes a rear side (6) with an inside surface that faces toward, and an outside surface that faces away from, the mobile device when it is arranged inside the case, the rear side (6) being connected to the first, second, third, and fourth sides (9,10, 7,8) to form the mobile-device recess (19) configured to hold the mobile device.

BRIEF DESCRIPTION OF THE DRAWINGS

FIG. 2 is an upper side view of the case in accordance with an embodiment of the invention.

FIG. 3 is a rear view of the case in accordance with an embodiment of the invention.

FIG. 4 is a right side view of the case in accordance with an embodiment of the invention.

FIG. 5 is a left side view of the case in accordance with an embodiment of the invention.

FIG. 6 is a lower side view of the case in accordance with an embodiment of the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

A case according to an embodiment of the invention can be arrived at by providing shock-absorbing impact geometry to the interior of the case in the form of triangular ridges that protrude from the inner surface of the sides of the case. The narrow tops of the ridges contact the surface of the device. When force is applied between the outside of the case and the device, such as during an impact event, the force causes the triangular ridges to deform against the surface of the device. As force increase, further deformation of the ridges increases the volume of deformed material. This configuration allows the case to absorb impact and reduce the forces communicated to a device within the case in the event the device and case are dropped on a hard surface.

Figure 1:
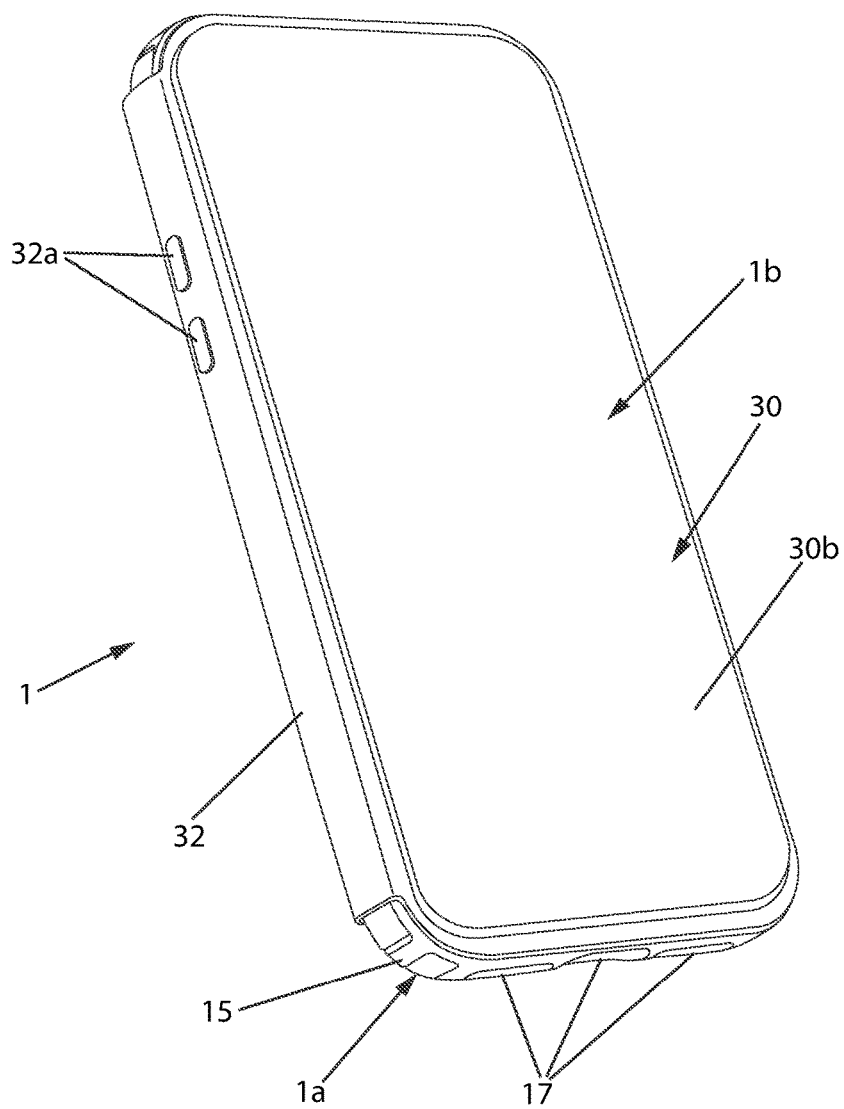
FIG. 1 is a front-left perspective view of the case in a closed position in accordance with an embodiment of the invention.
Figure 7:
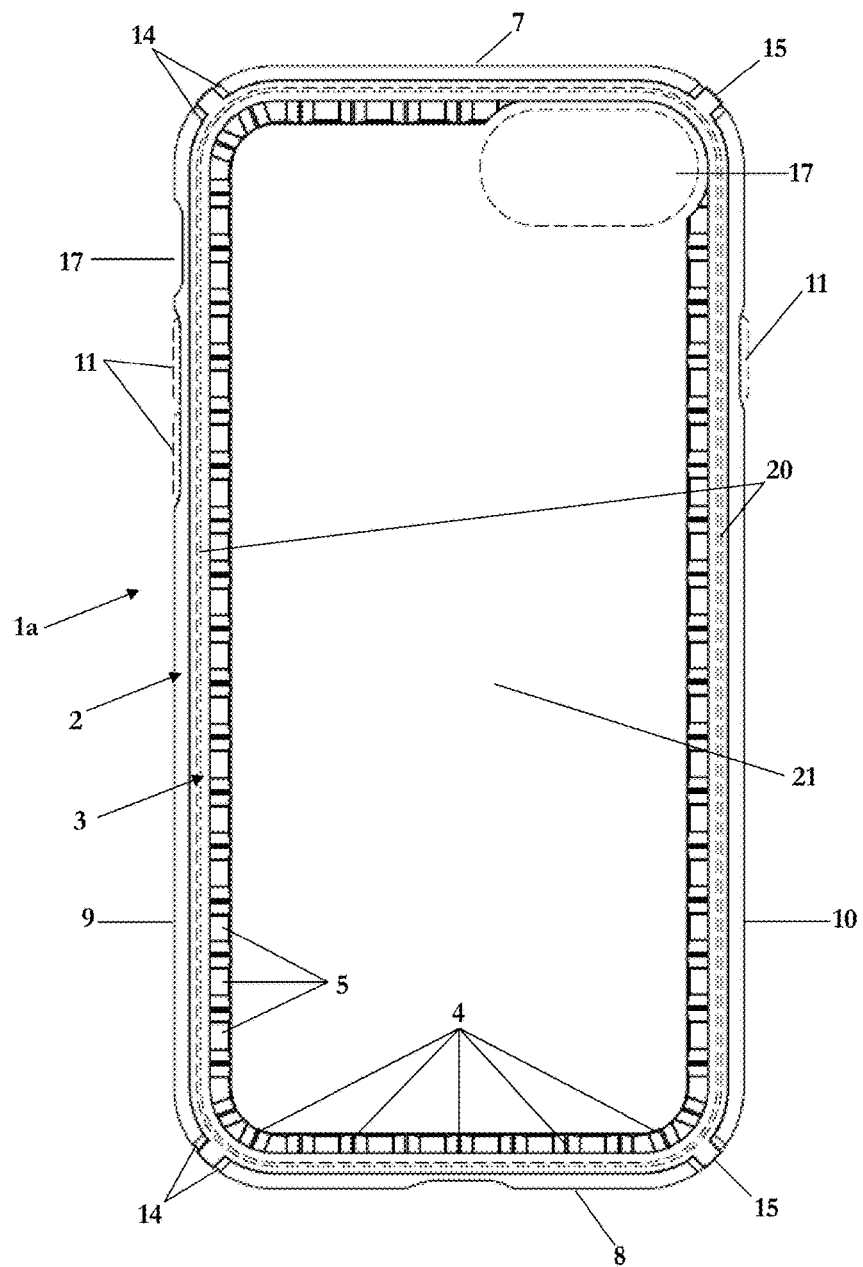
FIG. 7 is a front view of the case in accordance with an embodiment of the invention.
Figure 8:
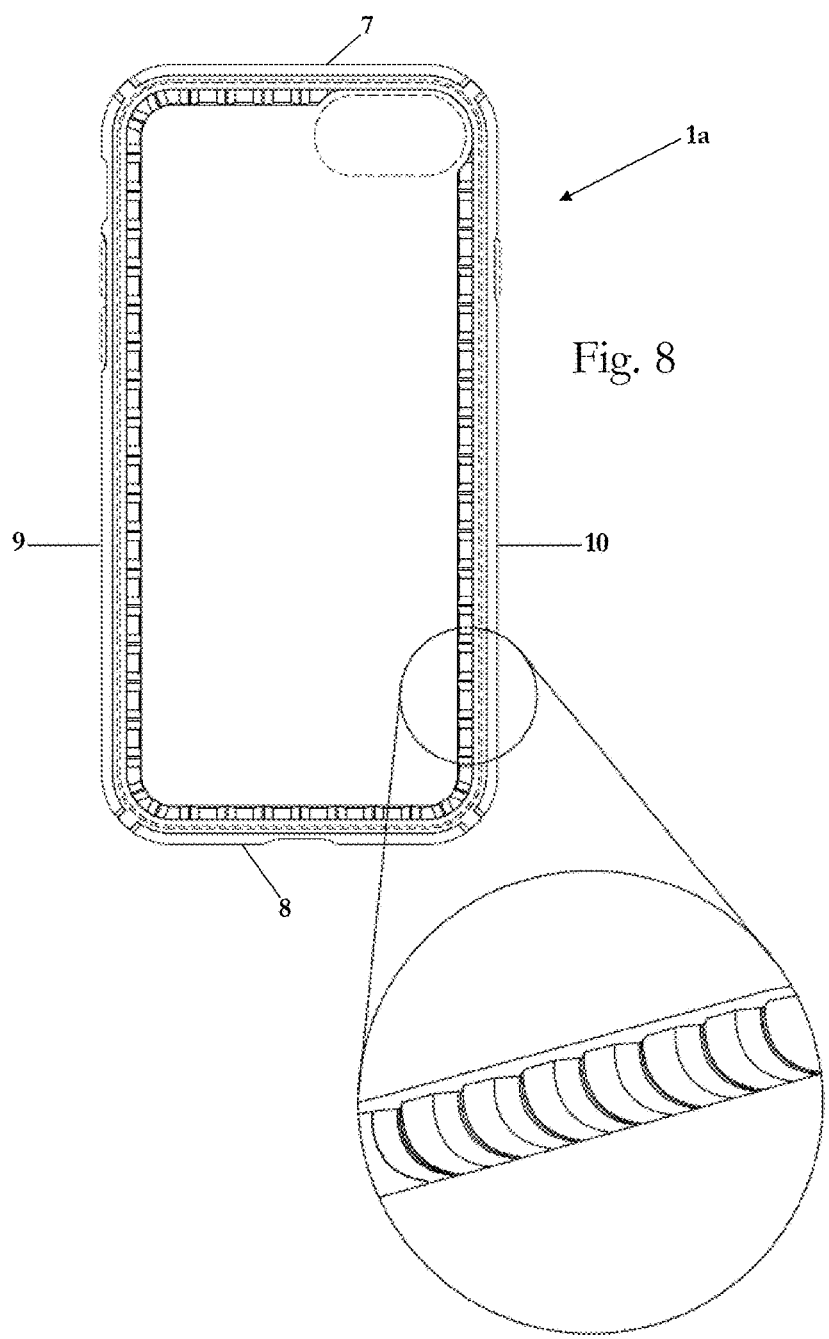
FIG. 8 is a front view of the case in accordance with an embodiment of the invention showing an enlarged view of a portion of the case.
Figure 9:
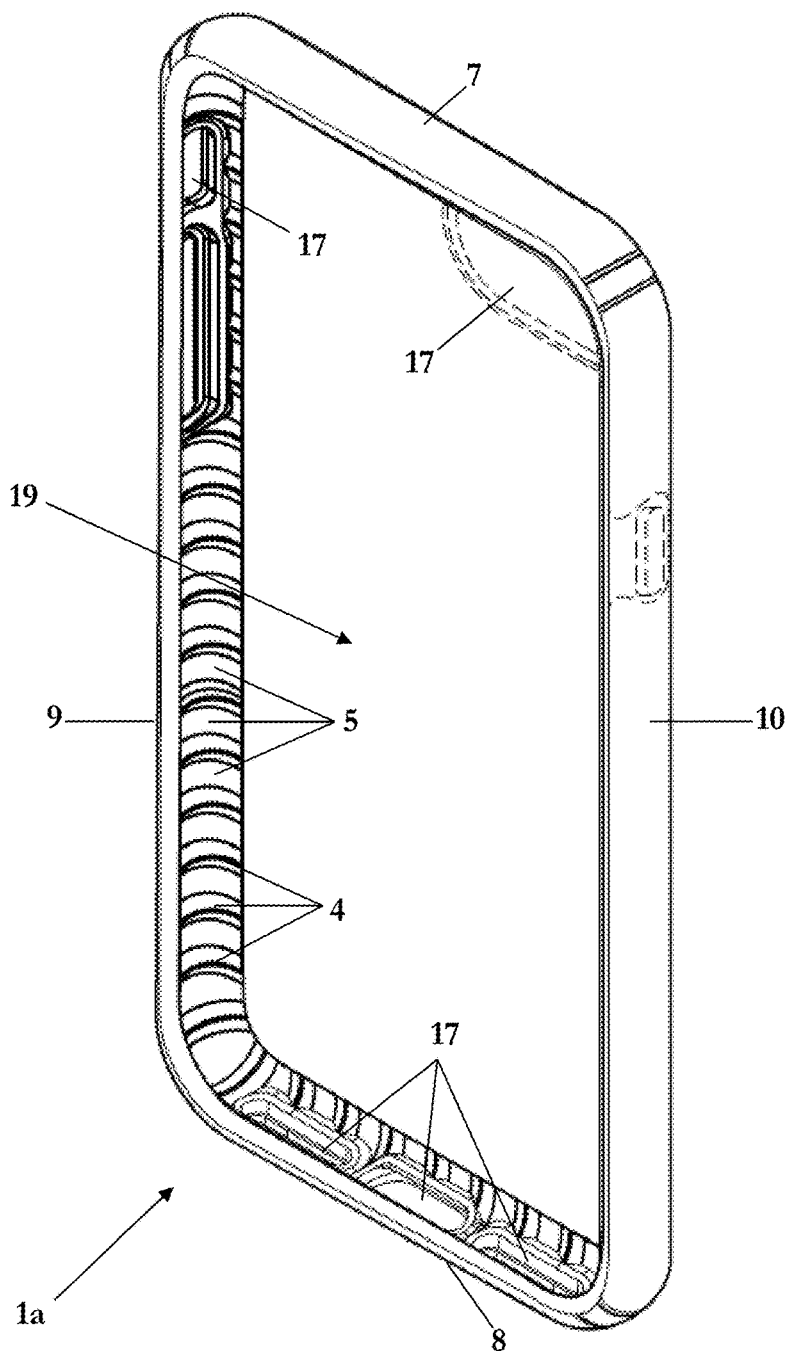
FIG. 9 is a front-right perspective view of the case in accordance with an embodiment of the invention.

FIG. 1 is a front-left perspective view of the case 1 in accordance with an embodiment of the invention. The case 1 includes a main body 1a and a cover 1b.

FIGS. 2-10 show an upper side view, a rear view, a right side, a left side view, a lower side view, a front view, a front view, a front-right perspective view, and a front-view cut-away, respectively, of the main body 1a of the case in accordance with an embodiment of the invention. The cover 1b is not shown in these figures for simplicity and to better show various aspects of the main body 1a. The cover 1b is shown in more detail in FIGS. 14 and 15.

The main body 1a includes a first layer or shell 2 and a second layer 3. The first layer or shell 2 includes a rear side having an inside surface (not shown) and an outside surface 6 opposite to the inside surface. An upper side 7, a lower side 8, a left side 9, and a right side 10 extend from the outside surface 6 of the rear side toward a front of the main body 1a so as to form a pocket or recess in which the second layer 3 will be—and eventually a mobile device can be—arranged. The second layer 3 also includes a corresponding rear side having an inside surface 21, as well as one or more of corresponding upper, lower, left, and right sides. A pocket or recess 19 may be formed in second layer 3 for receiving the mobile device.

In one embodiment, the rear sides of the first layer 2 and second layer 3 overlay each other. The rear sides of the first layer or shell 2 and second layer 3 are also preferably substantially coextensive with each other so that the rear side of each layer covers at least 50% of the surface area of the rear side of the other layer. It is also preferable that the respective upper sides, lower sides, left sides, and right sides of the first layer 2 and second layer 3 are substantially coextensive with each other so that the respective upper sides, lower sides, left sides, and right sides of each layer covers at least 50% of the surface area of the corresponding side of the other layer. Additionally, it is preferable that the rear of the main body 1a (formed by the rear sides of the first layer 2 and second layer 3) is configured to cover at least 90%, if not all, of the rear of a mobile device when the mobile device is arranged within the main body.

According to another embodiment, the respective upper sides, lower sides, left sides, and right sides of the first layer 2 and second layer 3 are only partially coextensive with each other so that the respective upper sides, lower sides, left sides, and right sides of the first layer 2 cover only a portion of the respective sides of the second layer 3.

The first layer or shell 2 is preferably formed from a rigid or hard material to create a rigid/hard outer shell which provides at least some impact protection as well as protection from being punctured by impacts with sharp objects. Examples of suitable hard/rigid materials include hardened plastic material, a rigid or semi-rigid plastic material, a rigid/hard rubber material, a polycarbonate material, a metal, an alloy, a para-aramid material, wood, glass, mirror, quartz, and any combination thereof, and may be any color or texture. Preferred materials include thermosetting plastics with a hard durometer having shore 30D to shore 100D, polycarbonate, poly(methyl methacrylate) ("PMMA"), metals, acrylonitrile butadiene styrene ("ABS"), PMMA, polyethylene terephthalate ("PET"), high durometer thermoplastic elastomers ("TPEs") and thermoplastic polyurethanes ("TPUs") having shore 30D to shore 100D, and any combination thereof. The hard protective exterior shell may be designed to mimic the finish of existing mobile devices, such as phones, MP3/4 players, tablets, laptops, and other mobile electronic devices. Many users like the feel of the original phone and would like to maintain that feel but still want protection for their device. The hard protective exterior shell of the present invention has a low coefficient of friction. This allows the device to be slipped in and out of pockets and bags easily with little resistance and without becoming attached to clothing or fabric materials—a major complaint from users when an elastomeric material is used for the outside of cases.

The outside surface of the first layer or shell 2 may be provided with a scratch resistant UV hardcoat, which resists scratches and prevents discoloration of the case due to UV exposure.

The second layer 3 is preferably formed from a soft elastomeric material which provides at least some shock protection from impact events such as drops or falls. Examples of suitable materials include thermoplastic elastomers ("TPEs"), thermoplastic polyurethane ("TPU"), polyolefins, silicone, rubber, and any combination thereof. The second layer 3 may also be designed so that there are no gaps between the rear of the mobile device and the inside surface 21 of the rear side of the main body 1a. This enables the case to have a very solid connection to the phone. The second layer 3 may additionally be formed with a lip or rim 20 so as to secure and retain the mobile device within the main body 1a. The elastomeric layer 3 also can be formed to have portions 11 designed to cover buttons on a mobile device. This allows a user to simply press the exposed portion 11 of the inner elastomeric layer 3 corresponding to the desired input of the mobile device.

The second layer 3 may also, or alternatively, be formed from a non-Newtonian dilatant material. The dilatant material is soft and flexible when at rest, but stiffens and/or hardens upon impact. In this way, the dilatant material is able to provide both impact protection by dispersing the force of an impact event along the surface of the second layer 3, and shock protection by absorbing some of the shock force of the impact event. This dual quality (i.e., absorbing and diffusing impact or impact forces) of the dilatant material allows for less material to be used to make the case-allowing for a thinner, lighter, and less bulky case which increases the portability of the protected mobile device—while still providing increased impact and shock protection to the mobile device encased therein.

Examples of suitable dilatant materials for the second layer 3 include materials made by D3O® (such as D3O® ST, D3O® XT, D3O® Shock+, and D3O® Aero), PORON® XRD™ made by Rogers Corporation, and ARTi-LAGE™ artificial cartilage foam made by ARTiLAGE™. Impact absorbing materials (such as foams) which have dilatant properties are especially preferred.

The dilatant material may have a hardness of at least 20 Shore OO, or may have a hardness of at least 5 Shore O. Preferably the hardness is at least 30 Shore OO, at least 50 Shore OO, at least 60 Shore OO, or at least 70 Shore OO. More preferably the hardness is in a range of 20-90 Shore OO, or in a range of 5-61 Shore O. More preferably still, the hardness is in a range of 30-80 Shore OO, or in a range of 5-40 Shore O. Even more preferably, the hardness is in a range of 40-70 Shore OO.

Preferably the second layer 3 has a hardness in the range of from 60-85 Shore A. If the second layer 3 is clear, its preferred hardness is 75-85 Shore A. If the second layer 3 is opaque, its preferred hardness is 60-75 Shore A.

Each of the first layer 2 and rear side of the second layer 3 is 0.5-4.0 mm thick. Preferably one or more of the layers is 0.6-3.0 mm thick. More preferably, one or more of the layers is 0.8-2.0 mm thick. Even more preferably, one or more of the layers is 0.9-1.3 mm thick.

Figure 10:
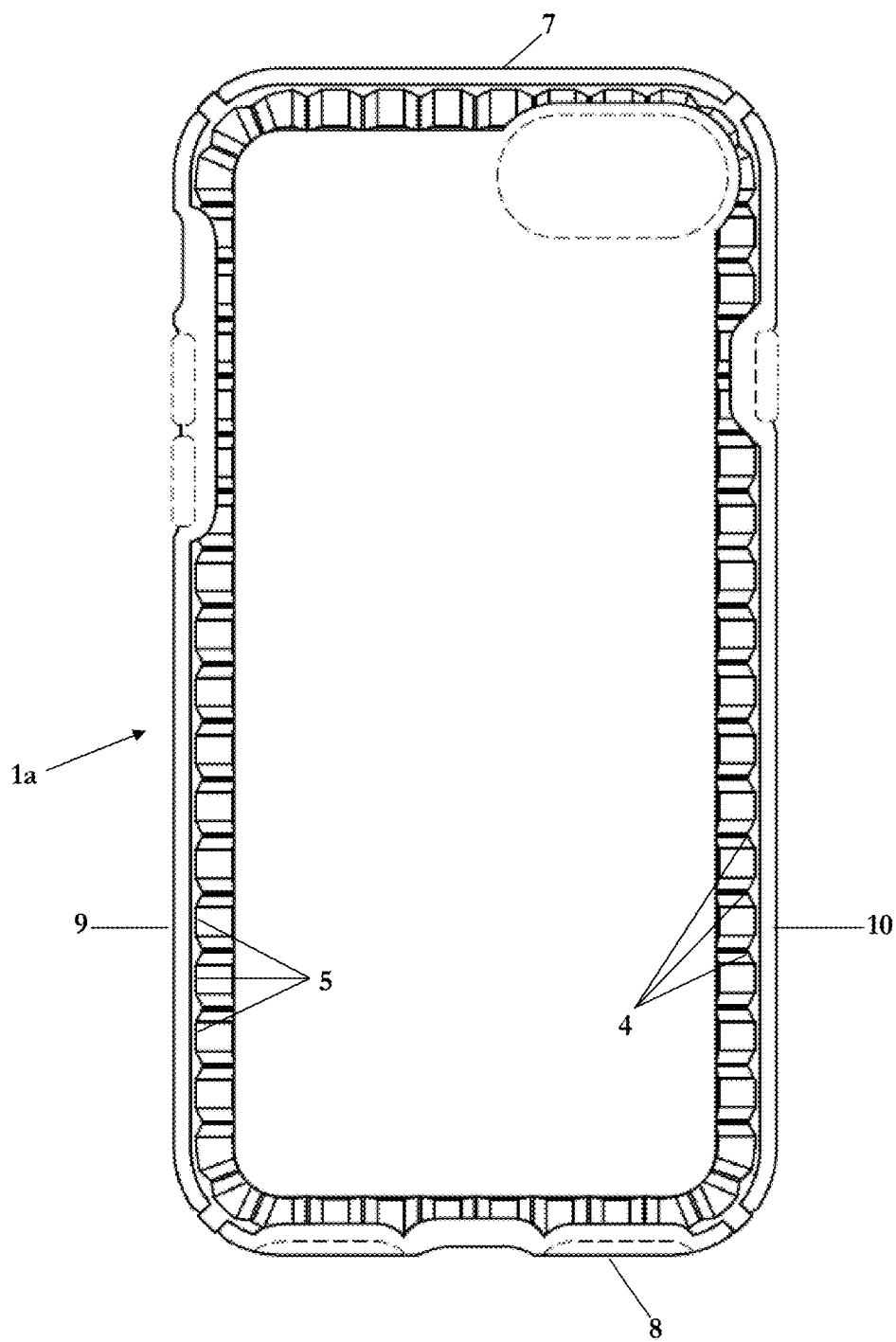
FIG. 10 is a front-view cutaway of the case in accordance with an embodiment of the invention.

The main body 1*a* includes shock-absorbing impact geometry in the form of triangular ridges 4 that protrude from the inner surface of one or more sides of the main body 1*a*. Between each triangular ridge 4 is a trough 5. The triangular ridges 4 are formed by the second layer 3, and so are made of the elastomeric or non-Newtonian dilatant material of the second layer 3. FIG. 10 shows a close-up view of a section of the second layer 3 with the triangular ridges 4 and the troughs 5. This unique series of triangular ridges 4 act as a shock barrier and dissipate impact forces.

The triangular shape of the ridges 4 absorbs shock. The triangular ridges deform when force is applied between the surface of the device and the hard layer 3. The triangular shaped ridges deform in a different manner than semicircular or rectilinear protrusions, which may provide improved absorption of energy and less communication of forces to the device due to impact than protrusions of other shapes. In particular, as the triangular ridges 4 of the current invention compress and deform between the mobile device and the main body 1*a* upon impact, the surface area of the triangular ridges 4 gradually increase.

Figure 11:
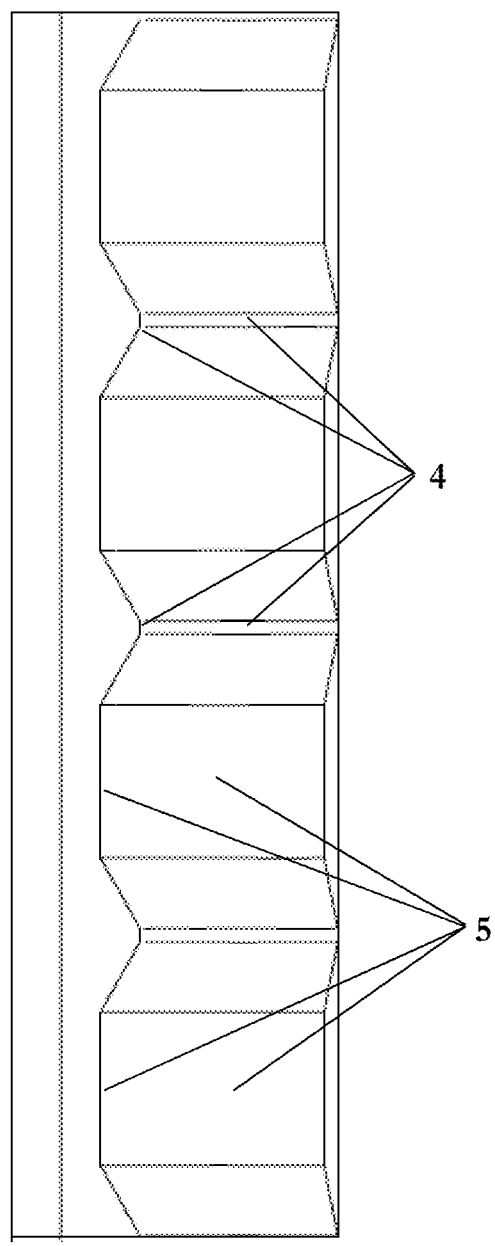
FIG. 11 shows a close-up view of the shock-absorbing triangular ridges 4 that protrude from the inner surface of the sides of the case, and the troughs 5 located between the triangular ridges 4.
Figure 12:
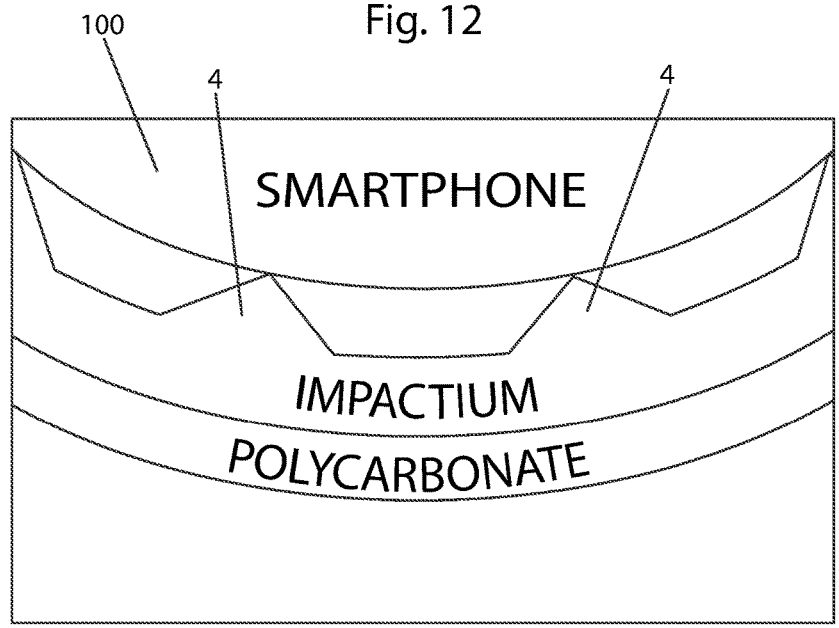
FIG. 12 shows a close-up cut-away view of the case 1 with a mobile device arranged therein prior to impact.
Figure 13:
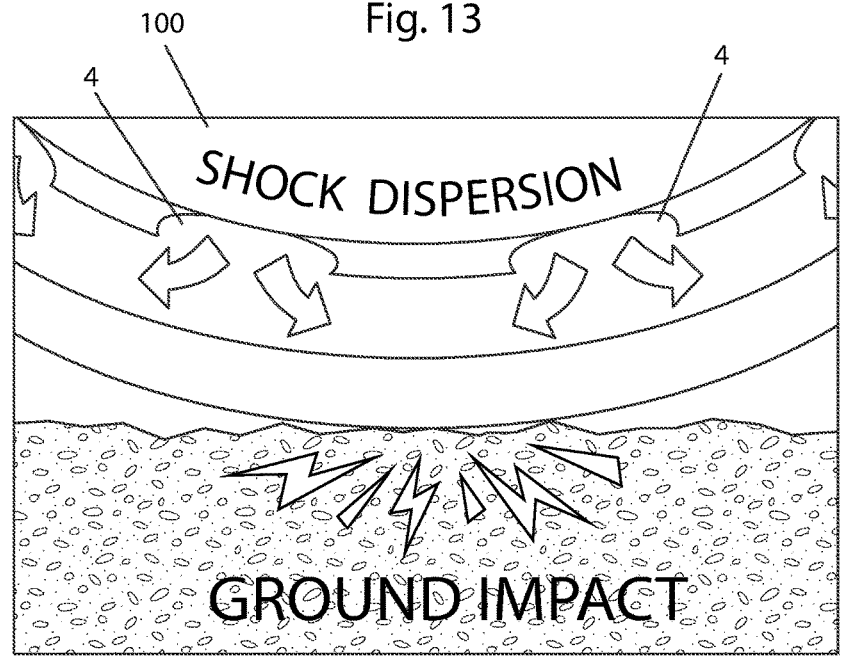
FIG. 13 shows a close-up cut-away view of the case 1 with a mobile device arranged therein during impact.

As shown in FIG. 11, the triangular ridges 4 only slightly contact the mobile device 100 arranged in the case 1. During impact, as shown in FIG. 12, the triangular ridges 4 compress against the mobile device 100, gradually changing shape (in cross section) from a triangular shape to a trapezoidal shape, and eventually to a rectilinear shape. This gradual change in cross-sectional shape of the triangular ridges 4 means that the shock-absorbing capability of the ridges 4 increases non-linearly-first due to the properties of the ridge material itself as it compresses and absorbs shock (i.e., the same way a solid and smooth layer of that material would absorb shock upon compression), and second due to the change in cross-sectional shape independent of the ridge material. The gradual change in cross-sectional shape of the triangular ridges 4 provides a slower decrease in velocity (i.e., a lower deceleration) of the mobile device during impact as compared to a semi-circular shape (which quickly becomes rectilinear) and a rectilinear shape (which is doesn't change its type of shape and merely compresses). Such a reduced deceleration results in less shock being absorbed by the mobile device, as it is instead absorbed by the gradual change in cross-sectional shape of the triangular ridges 4.

According to some embodiments the triangular ridges 4 protrude from the troughs 5 at a distance in the range of 0.300-4.00 mm, preferably 0.400-3.00 mm, more preferably 0.500-2.00 mm, and most preferably 0.600-1.50 mm. In one preferred embodiment, the distance between the surface of the troughs 5 and the tip of the triangular ridges 4 is around 1.00 mm.

The first layer 2 and second layer 3 may be co-molded/co-casted together or otherwise permanently affixed to each other, such as with an adhesive.

Alternatively, the first layer 2 and second layer 3 may be separable from one another as two distinct pieces. In such an instance, the two layers can be configured so that they mechanically engage with each other to form a unitary main body 1*a*. For example, the first layer 2 may be designed with slots or cutouts 14 into which corresponding ridges or ribs 15 of the second layer 3 engage (e.g., by snapping, pressure fitting, or any other suitable mechanical engagement). As another example opposite sides of the first layer 2 (e.g., upper side 7 and lower side 8, left side 9 and right side 10, or both) may be designed to snap onto and hold the second layer 3.

For example, one process for producing the case may include:
1. Mold the first layer 2; and
2. Place the first layer 2 into the overmold tool, and mold the second layer 3 onto the first layer 2.

Another example of a process for producing the case may include:
1. Mold the second layer 3; and
2. Place the second layer 3 into the overmold tool, and mold the first layer 2 onto the second layer 3.

Yet another example of a process for producing the case may include:
1. Mold the first layer 2;
2. Mold the second layer 3 (separately from, and before, after, or simultaneously with, the first layer 2); and
3. Join together the first layer 2 and the second layer 3.

It is noted that additional openings or cutouts 17 may be provided in at least a part of the main body 1*a* so as to allow various buttons, ports, or features of a protected mobile device to be accessed without having to remove the mobile device from the main body 1*a*. For example openings or cutouts 17 may be provided to allow a user to engage a button of the protected mobile device either directly or via the cover portion 11 of the layer 3. As another example, cutouts 17 may be provided to create an opening in the main body 1*a* though which a charging port, audio port, data port, or other electrical port of the mobile device may be accessed, either directly or via a pass-through connection. As yet another example, cutouts 17 may be provided to create an opening to expose a camera lens 101, audio speaker, microphone, or other feature of the device to be accessed or employed without removing the mobile device from the main body 1*a*.

While the embodiments of the main body 1*a* of the case 1 shown in the drawing are made from the two layers 2, 3, the main body 1*a* can also be made of a single layer 3 that forms both the interior and exterior of the main body 1*a*.

Figure 14:
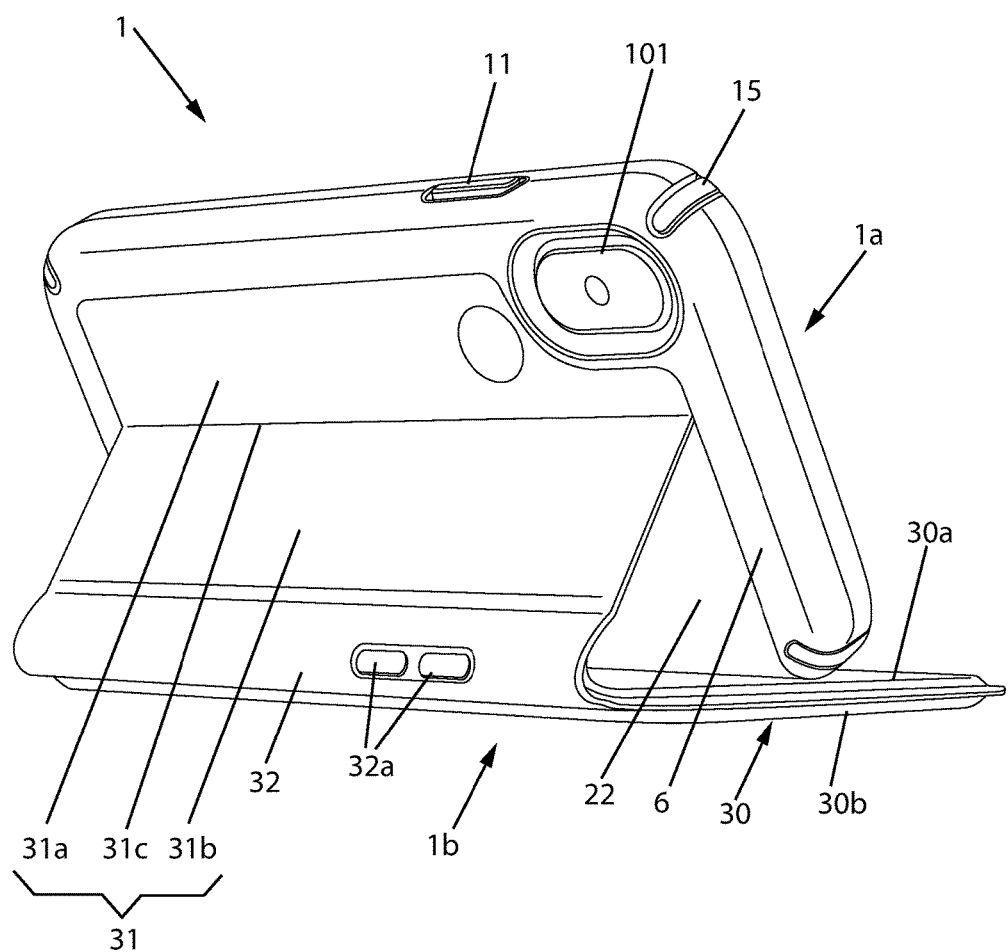
FIG. 14 is a rear perspective view of the case 1 in the stand position.

As shown in FIG. 14, in one embodiment, the cover 1*b* includes a front portion 30, a rear portion 31, and a first hinge portion 32. When the case 1 is in the closed state or position, as shown in FIG. 1, the front portion 30 covers the pocket or recess 19 in the main body 1*a*, thereby covering the front of a mobile device when arranged in the case 1. Preferably the cover 1*b* covers the entirety (i.e., 100%) of the pocket or recess 19 when the case is in the closed state or position.

Figure 15:
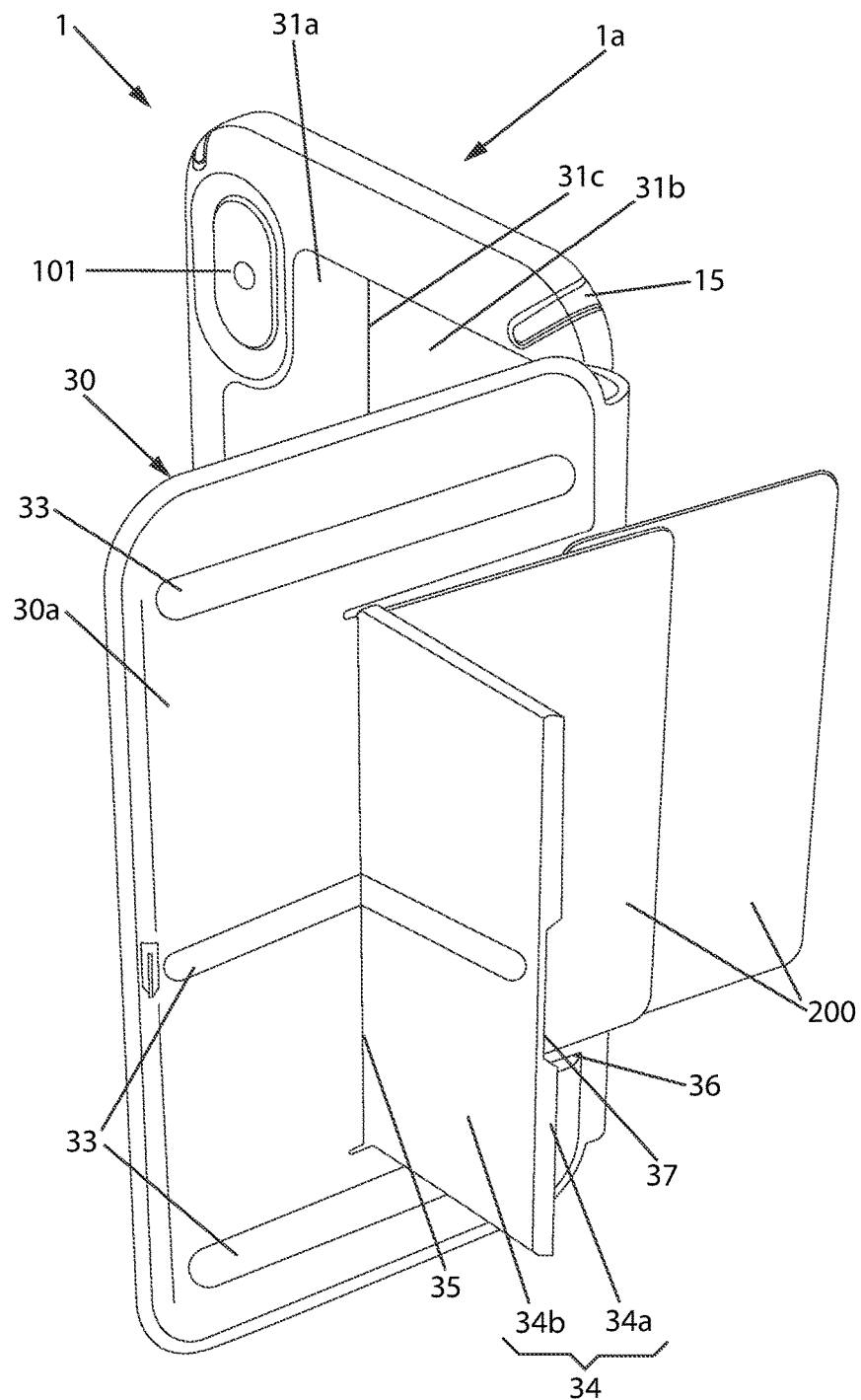
FIG. 15 is a view of the case 1 in an open position showing the inside of the cover.
Figure 16:
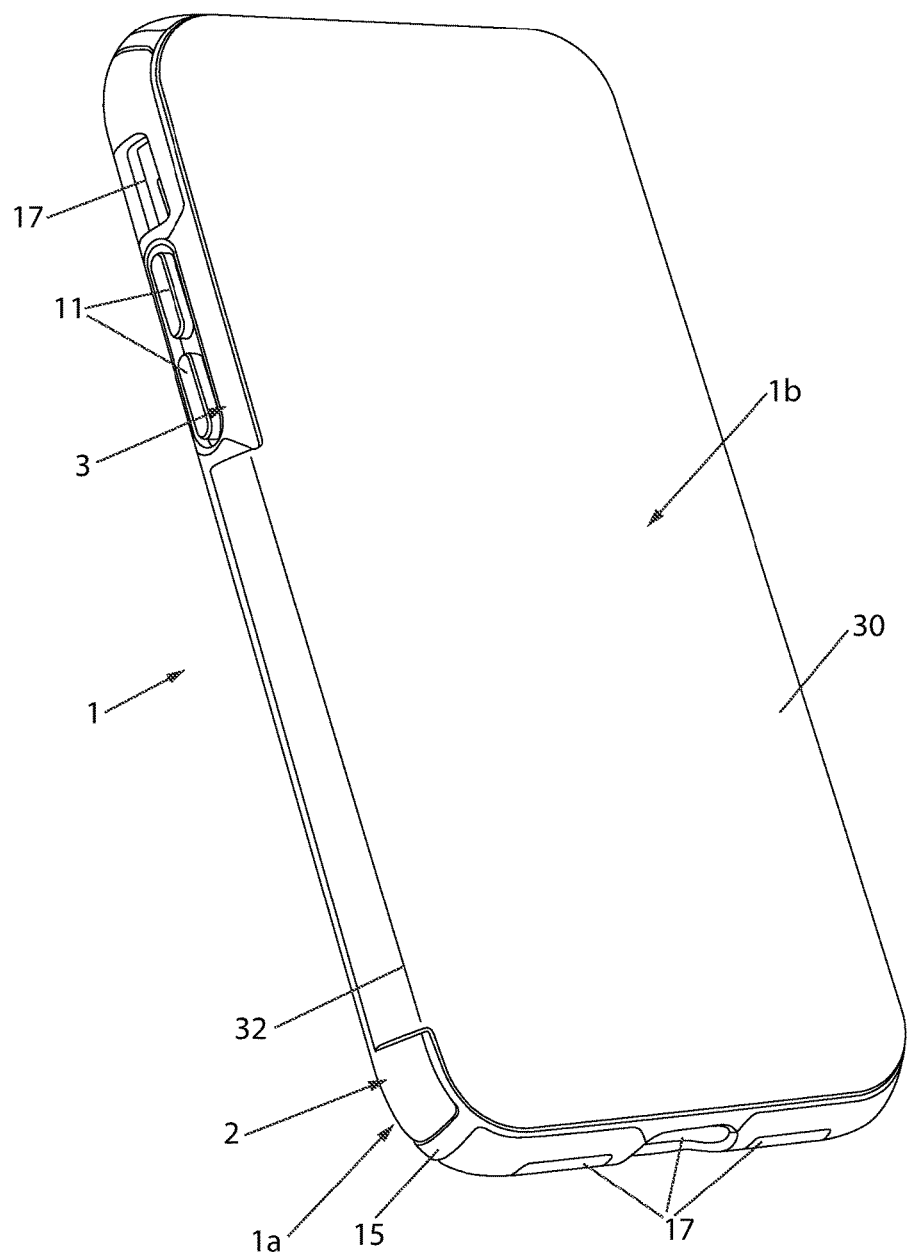
FIG. 16 is a front-left perspective view of the case 1 in a closed position in accordance with another embodiment of the invention.
Figure 17:
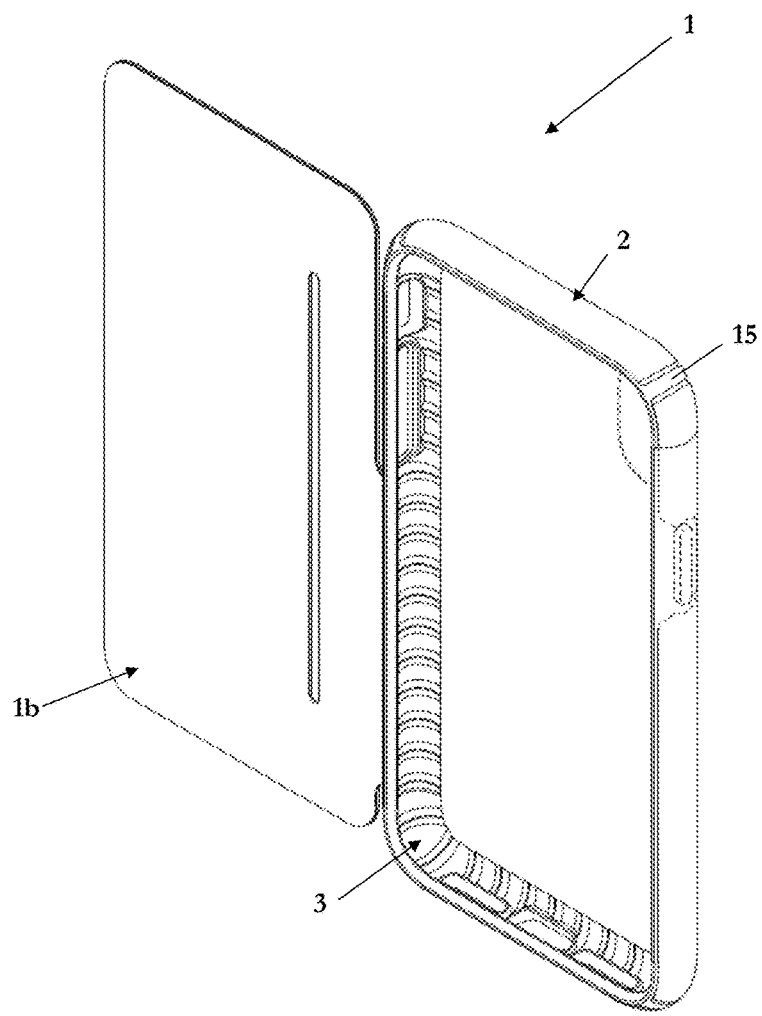
FIG. 17 is a front-left perspective view of the embodiment of the case 1 in FIG. 16 in an open position.

The first hinge portion 32 enables the front portion 30 to rotate with respect to the rear portion 31 so that the case 1 can be changed or switched between the closed position (shown in FIG. 1) and an open position (shown in FIG. 15). Preferably the first hinge portion 32 allows the front portion 30 to rotate at least 180° with respect to the rear portion 31. More preferably, the first hinge portion 32 allows the front portion 30 to rotate at least 270° with respect to the rear portion 31, as shown in FIG. 15. Most preferably, the hinge allows the front portion 30 to rotate at least 360° with respect to the rear portion 31. The first hinge portion 32 also can be formed to have portions 32a (either in addition to or instead of the portions 11 discussed above) designed to cover buttons on a mobile device. This allows a user to simply press the exposed portion 32a of the first hinge portion 32 corresponding to the desired input of the mobile device without having to open the cover 1b.

In the embodiment shown in FIG. 14, the rear portion 31 of the cover 1b includes a connecting portion 31a, a rotating portion 31b, and a second hinge portion 31c that connects the rotating portion 31b to the connecting portion 31a. The connecting portion is connected to the outside surface 6 of the rear side of the main body 1a. The second hinge portion 31c enables the rotating portion 31b to rotate with respect to the connecting portion 31 so that the case 1 can be changed or switched between the closed position (shown in FIG. 1) and a stand position (shown in FIG. 14).

As shown in FIG. 14, the rear side of the main body 1a can include a recess 22. The connecting portion 31a of the rear portion 31 of the cover 1b is arranged in the recess 22 to connect to the main body 1a. This connection is permanent, and can be formed by various means, such as adhesive, stitching or sewing, molding the connecting portion onto the main body 1a, molding the first layer or shell 2 onto or around the connecting portion 31a, or the like. The rotating portion 31b and the hinge portion 31c are arranged inside the recess 22 when the case 1 is in the closed state of FIG. 1 so that the outside surface of the rear portion 31—formed by the outside surfaces of the connecting portion 31a, rotating portion 31b, and hinge portion 31c—is flush or even with the outside surface 6 of the rear side of the main body 1a. This created a continuous flat surface on the rear of the case 1 when it is in the closed position, facilitating placing the case 1 into and removing the case 1 out of pockets, bags, and the like.

In one embodiment, the second hinge portion 31c allows the rotating portion 31b to rotate at least 30° with respect to the rear portion 31. Preferably the second hinge portion 31c allows the rotating portion 31b to rotate at least 45° with respect to the rear portion 31. More preferably, the hinge allows the front portion 30 to rotate at least 60° with respect to the rear portion 31. Even more preferably, the hinge allows the front portion 30 to rotate at least 90° with respect to the rear portion 31. Most preferably, the hinge allows the front portion 30 to rotate 180° with respect to the rear portion 31.

Optionally, an inside surface or side 30a of the front portion 30 of the cover 1b may include one or more grip strips 33. Each grip strip 33 has a coefficient of friction that is greater than that of the inside surface 30a to help the case 1 remain in the stand position shown in FIG. 14.

As shown in FIG. 15, the inside of the front portion 30 includes a door or flap 34. The flap 34 rotates or pivots around a flap hinge portion 35 so that the flap 34 moves between an open position or state that exposes an opening of a cavity or pocket 36 in which cards 200 can be placed, and a closed position or state that closes the cavity or pocket 36 to retain the cards 200 and prevent them from falling or slipping out of the cavity or pocket 36. The flap 34, when in the closed state, also covers and hides any cards in the cavity or pocket 36 from view, reducing the likelihood that the cards in the cavity 36 will be stolen. The flap 34 may include a notch, groove, or indentation 37 on a free end 34a of the flap 34 to assist a user in moving the flap 34 from the closed state to the open state. Preferably, the card cavity or pocket 36 is completely closed—with the potential exception of the notch, groove, or indentation 37—when the flap 34 is in the closed state.

When the flap 34 is in the closed state, a device-facing surface 34a is flush with the inside surface 30a of the front portion 30 to create one uniform flat device-facing surface that faces the screen of an electronic device when arranged within the case 1 with the front portion 30 of the cover 1b in the closed state. The prevents any irregular shapes from being formed on the inside of the cover 1b and contacting the screen of the electronic device when the cover 1b is in the closed state. This not only protects the screen in the event of drops or falls, but also protects the screen from damage caused by carrying the case 1 in the closed state with too many cards in the cover.

Preferably, at least part of the front portion 30 of the cover 1b is formed by a rigid material, such as any of the hard/rigid materials described above for the first layer or shell 2. For example, the front portion 30 may be formed from molded polycarbonate. The rigid material of the front portion 30 may be overlaid or covered by a soft material, such as a fabric (i.e., cotton or polyester, woven, felted, or knitted, etc.), a leather (e.g., cow, deer, snake, or other animal skin), polyurethane, or any of the materials described above for the second layer 3. The soft material of the front portion may overlay or overlap the rigid material on the inside device-facing surface (i.e., 30a,34b) of the front portion 30, the outside surface or side 30b of the front portion 30, or both. The rigid material may also be fully encased or covered by one or more soft materials so that no part of the rigid material is exposed unless the cavity or pocket 36 is exposed by opening the flap 34.

In one embodiment, the front portion 30 is formed by three pieces of one of the hard/rigid materials listed above for the first layer or shell 2. The first hard/rigid piece forms at least part of the inside side 30a of the front portion 30. The second hard/rigid piece forms at least part of an outside surface or side 30b of the front portion 30, and is connected to the first hard/rigid piece. The third hard/rigid piece forms at least a part of the flap 34, and is connected to the first hard/rigid piece via the flap hinge portion 35. The card a cavity or pocket 36 is formed between the first and second hard/rigid pieces by a recess formed in the first hard/rigid piece, a recess formed in the second hard/rigid piece, or a combination thereof. The third hard/rigid piece may be completely flat, or may have a lip or rim 34a that extends from the main flat portion 34a at an angle greater than 0°—preferably at an angle equal to or greater than 30°, more preferably at an angle equal to or greater than 45°, and most preferably at an angle of from 45° to 90°.

The rear portion 31 of the cover 1b may be formed of a rigid material overlaid in part or completely by a soft material—like the front portion 30—or may be formed entirely of one or more of the above-described soft materials. Preferably, part or all of at least an exterior surface or side of the rear portion 31 facing away from the case 1 is formed of one or more of the above-described soft materials.

The first hinge portion 32, the second hinge portion 31c, or both, may be rigid hinges, or may be formed in part or entirely by any of the soft materials described above for the front portion 30.

In another embodiment, shown in FIGS. 16-19, one or more parts 32*a* of the first hinge portion 32 is connected to the main body 1*a* by being sandwiched between the first layer or shell 2 and the second layer 3 on the left side 9. Alternatively, the part of the first hinge portion 32 can be connected to the main body 1*a* by being sandwiched between the first layer or shell 2 and the second layer 3 on the right side 10, upper side 7, or lower side 8. Sandwiching this part 32*a* of the first hinge portion 32 between the first layer or shell 2 and the second layer 3 allows the case 1 to be made thinner and lighter, since the rear portion 31 and means for connecting the rear portion 31 to the outside surface 6 of the rear side of the main body 1*a* are not needed. In addition, molding the first layer or shell 2, the second layer 3, or both around this part of the first hinge portion 32 provides a more secure connection between the cover 1*b* and the main body 1*a* than if a part of the cover 1*b* is attached to an outside surface of the main body 1*a*. Preferably, at least the one or more parts 32*a* are made from one of the above-described soft and/or flexible materials.

Figure 19:
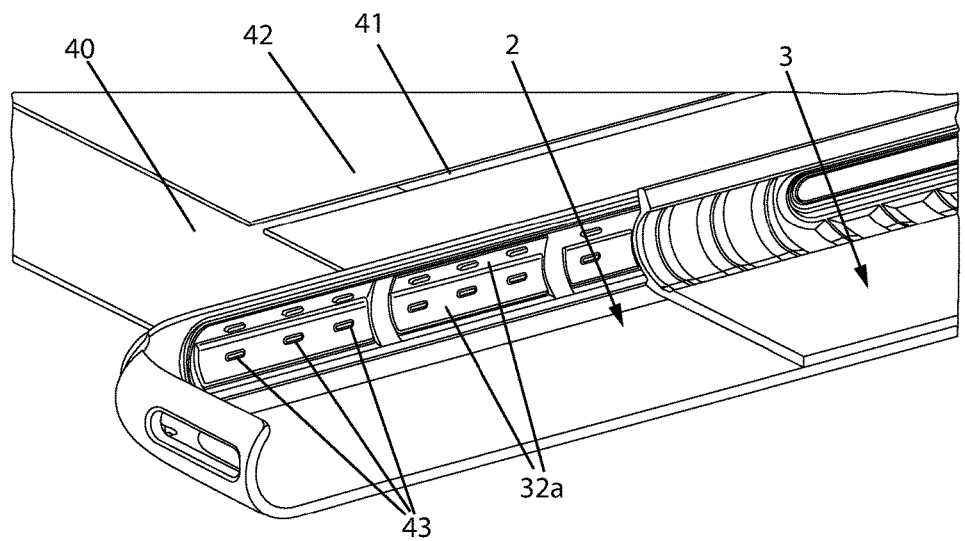
FIG. 19 is a partial cutaway view of the embodiment of the case 1 in FIG. 17 showing various layers of the case.

As shown in FIG. 19, the first layer or shell 2 may include teeth or protrusions 43 to help keep the one or more parts 32*a* of the first hinge portion 32 from moving during molding of the case 1. This traps the one or more parts 32*a*, preventing them from moving. By forming the case 1 in this way with this construction, glue is not needed to bond the first hinge portion 32—including the one or more parts 32*a*—to the main body 1*a*.

Figure 18:
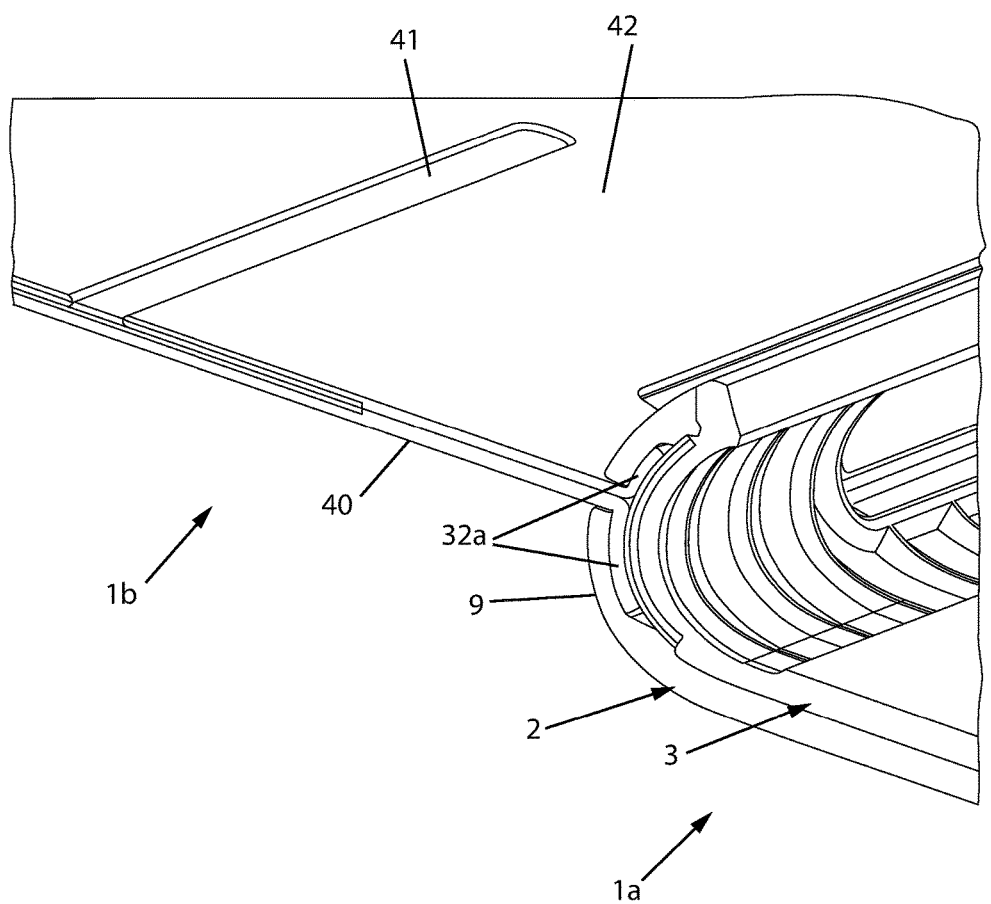
FIG. 18 is a partial cutaway view of the embodiment of the case 1 in FIG. 17.

In any of the above-described embodiments, the cover 1*b* can be made up of a single layer or a plurality of layers. For example, as shown in FIGS. 18 and 19, the cover can be made from three separate layers 40,41,42. Preferably, at least the middle layer 41 is made from one of the above-described hard and/or rigid materials. It is also preferable that this hard and/or rigid layer 41 covers most of the screen of a mobile device arranged in the case 1 when the case 1 is in the closed state or position. In particular, it is preferable that the hard/rigid layer 41 covers at least 50%—more preferably at least 75%, most preferably 100%—of the screen of a mobile device arranged in the case 1 when the case 1 is in the closed state or position. Such a configuration provides rigidity to the cover 1*b* to prevent if from deforming when the case 1 is put into or removed from pockets, bags, etc.—especially when the case 1 is in the closed state.

It is also preferable that the innermost layer 42, which faces the screen of a mobile device arranged in the case 1 when the case 1 is in the closed state or position, is made from one of the above-described soft and/or flexible materials. This configuration protects the screen of the mobile device from being scratched-especially when the case 1 is in the closed state.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "left side", "right side", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:
1. A case for a mobile device, comprising:
   a main body comprising a mobile-device recess configured to hold the mobile device; and
   a cover attached to the main body, the cover comprising:
   a front portion configured to move between a closed state where the cover covers the mobile-device recess and an open state where the cover does not cover the mobile-device recess so that the mobile-device recess is exposed,
   wherein the front portion of the cover comprises:
   an inside surface that faces the mobile-device recess of the main body when the front portion is in the closed state;
   a card cavity configured to accept at least one card, the card cavity defining a recess extending from the inside surface of the front portion in a direction away from the mobile device when the front portion is in the closed state; and
   a flap configured to move between a closed state where the flap covers at least one part of the card cavity and an open state where the flap does not cover the at least one part of the card cavity so that the card cavity is exposed, wherein the flap is formed on the inside surface of the front portion of the cover so that the card cavity is only accessible from the inside surface of the front portion.
2. The case for a mobile device according to claim 1, wherein, when the flap is in the closed state, a mobile-device-facing surface of the flap and a mobile-device-facing surface of the inside surface form one continuous, flat mobile-device-facing surface that faces the mobile-device recess when the front portion of the cover is in the closed state.
3. The case for a mobile device according to claim 1, wherein the flap comprises:
   a free end; and
   a notch to assist a user in moving the flap from the closed state to the open state.
4. The case for a mobile device according to claim 1, further comprising:
   at least one friction portion arranged on the inside surface of the front portion of the cover, the at least one friction portion having a coefficient of friction that is greater than the inside surface.
5. The case for a mobile device according to claim 1, wherein the cover further comprises:
   a rear portion connected to a rear side of the main body; and
   a first hinge portion connected to both the front portion and the rear portion of the cover, and wherein the front portion rotates around the first hinge portion to move between the closed state and the open state.

6. The case for a mobile device according to claim 5, wherein the rear portion of the cover comprises:
a connecting portion connected to the rear side of the main body;
a rotating portion; and
a second hinge portion connected to both the connecting portion and the rotating portion to enable the rotating portion to rotate with respect to the rear side in order to place the case in a stand state.

7. The case for a mobile device according to claim 5, wherein, in the stand state, a side that is connected to and extends away from the rear side of the main body rests on the inside surface of the front portion of the cover.

8. The case for a mobile device according to claim 5, wherein the main body further comprises a rear recess in which the rear portion of the cover is arranged when the front portion of the cover is in the closed state.

9. The case for a mobile device according to claim 1, wherein the cover further comprises a first hinge portion connected to the front portion of the cover,
wherein the front portion rotates around the first hinge portion to move between the closed state and the open state, and
wherein at least part of the first hinge portion is arranged within and surrounded by the main body to attach the cover to the main body.

10. The case for a mobile device according to claim 9, wherein the main body further comprises:
a first layer comprising a first material; and
a second layer comprising a second material different from the first material, and
wherein the at least part of the first hinge portion is arranged between the first layer and the second layer.

11. The case for a mobile device according to claim 1, wherein the card cavity is configured to accept at least one card selected from the group consisting of credit card, a payment card, an identification card, a business card, a coupon, a receipt, a merchandise credit card, and a gift card.

12. The case for a mobile device according to claim 1, wherein the front portion further comprises:
a first piece that forms at least part of the inside surface;
a second piece that forms at least part of the flap, and which is rotatably connected to the first piece, the second piece being distinct from the first piece; and
a third piece that forms at least part of an outside side of the front portion, and which is fixedly connected to the first piece, the third piece being distinct from the first and second pieces,
wherein the card cavity is formed between the first and third pieces, and
wherein each of the first, second, and third pieces comprises a same or different material selected from the group consisting of hardened plastic materials, rigid or semi-rigid plastic materials, rigid or hard rubber materials, polycarbonate materials, metals, alloys, para aramid materials, wood, glass, mirror, quartz, and any combination thereof.

13. The case for a mobile device according to claim 1, further comprising:
a first side with an inside surface and an outside surface opposite to the inside surface;
a second side with an inside surface and an outside surface opposite to the inside surface;
a third side with an inside surface and an outside surface opposite to the inside surface; and
a fourth side with an inside surface and an outside surface opposite to the inside surface,
wherein the inside surface of the first side faces toward the inside surface of the second side,
wherein the inside surface of the third side faces toward the inside surface of the fourth side,
wherein the first and second sides are arranged between the third and fourth sides and the third and fourth sides are arranged between the first and second sides so that the first, second, third, and fourth sides form at least part of a frame configured to surround a periphery of the mobile device when the mobile device is arranged inside the case, and
wherein at least one of the inside surfaces of the first, second, third, and fourth sides includes triangular protrusions that have a triangular cross section and extend toward the inside of the case so that an apex of each of the triangular protrusions contacts the mobile device when arranged inside the case.

14. The case for a mobile device according to claim 13, wherein at least two of the inside surfaces of the first, second, third, and fourth sides include the triangular protrusions.

15. The case for a mobile device according to claim 13, wherein at least three of the inside surfaces of the first, second, third, and fourth sides include the triangular protrusions.

16. The case for a mobile device according to claim 13, wherein the inside surface of the first side is connected to the inside surface of the third side to form a first corner, the first corner having an inside surface that includes at least one of the triangular protrusions.

17. The case for a mobile device according to claim 16, wherein the inside surface of the second side is connected to the inside surface of the third side to form a second corner, the second corner having an inside surface that includes at least one of the triangular protrusions.

18. The case for a mobile device according to claim 16, wherein the inside surface of the second side is connected to the inside surface of the fourth side to form a third corner, the third corner having an inside surface that includes at least one of the triangular protrusions.

19. The case for a mobile device according to claim 13, further comprising:
a rear side with an inside surface that faces toward, and an outside surface that faces away from, the mobile device when arranged inside the case, the rear side being connected to the first, second, third, and fourth sides to form the mobile device recess configured to hold the mobile device.

20. A case for a mobile device, comprising:
a main body comprising a mobile-device recess configured to hold the mobile device; and
a cover attached to the main body, the cover comprising:
a front portion configured to move between a closed state where the cover covers the mobile-device recess and an open state where the cover does not cover the mobile-device recess so that the mobile-device recess is exposed,
wherein the front portion of the cover comprises:
an inside surface that faces the mobile-device recess of the main body when the front portion is in the closed state;

a card cavity configured to accept at least one card;
a flap configured to move between a closed state where the flap covers at least one part of the card cavity and an open state where the flap does not cover the at least one part of the card cavity so that the card cavity is exposed, wherein the flap is formed on the inside surface of the front portion of the cover so that the card cavity is only accessible from the inside surface of the front portion; and
at least one friction portion arranged on the flap, the at least one friction portion having a coefficient of friction that is greater than the inside surface.

* * * * *